United States Patent
Ling et al.

(10) Patent No.: US 9,348,092 B1
(45) Date of Patent: May 24, 2016

(54) MODE SIZE CONVERTERS FOR REDUCING A MODAL PROFILE OF INCOMING LIGHT

(71) Applicant: Tyco Electronics Corporation, Berwyn, PA (US)

(72) Inventors: Tao Ling, Harrisburg, PA (US); Jonathan Lee, Harrisburg, PA (US)

(73) Assignee: Tyco Electronics Corporation, Berwyn, PA (US)

(*) Notice: Subject to any disclaimer, the term of this patent is extended or adjusted under 35 U.S.C. 154(b) by 9 days.

(21) Appl. No.: 14/537,580

(22) Filed: Nov. 10, 2014

(51) Int. Cl.
*G02B 6/30* (2006.01)
*G02B 6/36* (2006.01)
*G02B 6/26* (2006.01)
*G02B 6/14* (2006.01)
*G02B 6/125* (2006.01)

(52) U.S. Cl.
CPC ............... *G02B 6/305* (2013.01); *G02B 6/125* (2013.01); *G02B 6/14* (2013.01)

(58) Field of Classification Search
CPC ........ G02B 6/305; G02B 6/1228; G02B 6/26; G11B 5/4866; H04B 10/2581; H04B 6/262
USPC ...................... 385/43–49, 88–92, 147; 372/70
See application file for complete search history.

(56) References Cited

U.S. PATENT DOCUMENTS

| | | | | |
|---|---|---|---|---|
| 6,760,520 | B1* | 7/2004 | Medin | G02B 6/305 385/43 |
| 7,738,753 | B2* | 6/2010 | Assefa | B82Y 20/00 216/2 |
| 2002/0110328 | A1* | 8/2002 | Bischel | G02B 6/4201 385/49 |
| 2003/0044118 | A1* | 3/2003 | Zhou | G02B 6/1228 385/43 |
| 2003/0053756 | A1* | 3/2003 | Lam | G02B 6/1228 385/49 |
| 2004/0114869 | A1* | 6/2004 | Fike | G02B 6/124 385/43 |
| 2004/0202418 | A1* | 10/2004 | Ghiron | G02B 6/34 385/36 |
| 2005/0025993 | A1* | 2/2005 | Thompson | C07C 13/567 428/690 |
| 2005/0180678 | A1* | 8/2005 | Panepucci | G01D 5/266 385/13 |
| 2006/0204175 | A1* | 9/2006 | Laurent-Lund | G02B 6/1228 385/43 |
| 2009/0245728 | A1* | 10/2009 | Cherchi | G02B 6/14 385/28 |
| 2012/0170881 | A1* | 7/2012 | Deans | F16H 57/029 384/416 |

OTHER PUBLICATIONS

Qian Wang, et al. "Y-Branch spot-size converter for a buried silica waveguide with large index difference", Applied Optics, Jun. 1, 2004, pp. 3315-3318, vol. 43, No. 16.

Sharee J. McNab et al. Ultra-low loss photonic integrated circuit with membrane-type photonic crystal waveguides, Optics Express 2927, 13 pages, Nov. 3, 2003, vol. 11, No. 22.

* cited by examiner

*Primary Examiner* — Akm Enayet Ullah

(57) ABSTRACT

Mode size converter including an overlay waveguide having an input end configured to receive light from an optical element. The overlay waveguide has a first refractive index. The mode size converter also includes a signal waveguide that is embedded within the overlay waveguide and has a second refractive index that is greater than the first refractive index. The signal waveguide includes first and second arm segments and a stem segment that form a Y-junction. The first and second arm segments are configured to reduce a modal profile of the light propagating toward the stem segment from the input end of the overlay waveguide. Each of the first and second arm segments has a distal end and a pair of opposite side edges, wherein the pair of side edges extend parallel to each other between the corresponding distal end and the stem segment.

20 Claims, 7 Drawing Sheets

MODE SIZE CONVERTERS FOR REDUCING A MODAL PROFILE OF INCOMING LIGHT

BACKGROUND

The subject matter herein relates generally to mode size converters that change a modal profile of propagating light and optical devices including the mode size converters.

Recently, more and more industries have begun to use optical devices and, in particular, optical devices developed through silicon photonics. Such optical devices include photonic integrated circuits (PICs), which may be used for various applications in optical communications, instrumentation, and signal-processing fields. A PIC may include submicron waveguides to interconnect various on-chip components, such as optical switches, couplers, routers, splitters, multiplexers/demultiplexers, modulators, amplifiers, wavelength converters, optical-to-electrical signal converters, and electrical-to-optical signal converters. One advantage that PICs have is the potential for large-scale manufacturing and integration through known semiconductor fabrication techniques, such as complementary metal-oxide-semiconductor (CMOS).

A PIC may be optically coupled to an external optical fiber such that the PIC receives light from the optical fiber and/or directs light into the optical fiber. However, it can be challenging to optically couple the optical fiber and the PIC in a reliable and efficient manner. For instance, the optical fiber has a cross-sectional area that is much larger than the cross-sectional area of the submicron waveguide of the PIC. Consequently, light propagating within the optical fiber will have a much larger modal profile than the modal profile of the light in the waveguides of the PIC. When the light transitions between the optical fiber and the PIC, the modal profile of the light must change in size (a process referred to as mode conversion) without significant losses.

One known mode size converter (or spot size converter) includes an overlay (or cladding) waveguide and a silicon waveguide that is embedded within the overlay waveguide. The silicon waveguide has an inverted taper geometry in which a tip of the silicon waveguide is positioned proximate to an edge of the overlay waveguide. As the silicon waveguide extends from the tip, a width of the silicon waveguide adiabatically widens to a final cross-sectional area that is capable of supporting a propagating mode. Light from the optical fiber enters through the edge of the overlay waveguide and is coupled evanescently to the silicon waveguide. The light becomes progressively more confined as the silicon waveguide widens to the single-mode strip waveguide. Accordingly, the modal profile of the light from the optical fiber is reduced to a size that is suitable for propagating through the silicon waveguide.

Although such mode size converters can effectively reduce the modal profile, the mode size converters may have some challenges or drawbacks. For example, the mode size converter may have a coupling efficiency that is insufficient, may have a low tolerance for alignment, and/or may be commercially impractical to manufacture.

Accordingly, there is a need for a mode size converter that has a sufficient coupling efficiency, a high tolerance for alignment, and/or is not cost prohibitive to manufacture.

BRIEF DESCRIPTION

In an embodiment, a mode size converter is provided that includes an overlay waveguide having an input end configured to receive light from an optical element. The overlay waveguide has a first refractive index. The mode size converter also includes a signal waveguide that is embedded within the overlay waveguide and has a second refractive index that is greater than the first refractive index. The signal waveguide includes first and second arm segments and a stem segment that form a Y-junction. The first and second arm segments are configured to reduce a modal profile of the light propagating from the input end of the overlay waveguide toward the stem segment. Each of the first and second arm segments has a distal end and a pair of opposite side edges. The pair of side edges extends parallel to each other between the corresponding distal end and the stem segment.

In some embodiments, each of the first and second arm segments may include an angled extension and a base portion that is coupled to the corresponding angled extension. The angled extensions of the first and second arm segments may form a V-shaped pattern. The base portions of the first and second segments may extend substantially parallel to each other with an operable gap there between.

In some embodiments, the stem segment may include an intermediate portion and a guide portion. The intermediate portion may couple to the first and second arm segments and have an inverted taper geometry that tapers from a base of the intermediate portion to a coupling end of the intermediate portion. The coupling end may couple to the first and second arm segments. The base may couple to the guide portion of the stem segment.

In some embodiments, the light may be configured to propagate along a light-propagating axis from the input end of the overlay waveguide to the stem segment. The Y-junction may be symmetrical with respect to a plane that includes the light-propagating axis.

In some embodiments, the overlay waveguide has a width and includes a taper section. The width of the overlay waveguide may decrease along the taper section as the overlay waveguide extends from the input end toward the signal waveguide. Optionally, the overlay waveguide may include a channel section having at least a portion of the signal waveguide disposed therein. The taper section may be located between the input end and the channel section. In some embodiments, the distal ends of the first and second arm segments may be disposed within the taper section, within the channel section, or at a boundary there between. In particular embodiments, the distal ends of the first and second arm segments are disposed at or immediately near the boundary between the channel section and the taper section.

In an embodiment, a mode size converter is provided that includes an overlay waveguide having an input end configured to receive light from an optical element. The overlay waveguide has a first refractive index. The mode size converter also includes a signal waveguide that is embedded within the overlay waveguide and has a second refractive index that is greater than the first refractive index. The signal waveguide includes first and second arm segments and a stem segment that form a Y-junction. The first and second arm segments are configured to reduce a modal profile of the light propagating from the input end of the overlay waveguide toward the stem segment. Each of the first and second arm segments includes an angled extension and a base portion that is coupled to the angled extension. The angled extensions of the first and second arm segments form a V-shaped pattern. The base portions of the first and second segments extend substantially parallel to each other with an operable gap there between.

In some embodiments, each of the first and second arm segments has a distal end and a pair of opposite side edges.

The pair of side edges may extend parallel to each other between the corresponding distal end and the stem segment.

In some embodiments, the base portions of the first and second segments may have inverted taper geometries. Each of the base portions may extend between a joint end that couples to the corresponding angled extension and a base end that couples to the stem segment.

In some embodiments, the mode size converter also includes a substrate layer that supports the signal waveguide and the overlay waveguide. The substrate layer may have a mounting extension that extends beyond the input end of the overlay waveguide.

DETAILED DESCRIPTION

Figure 1:
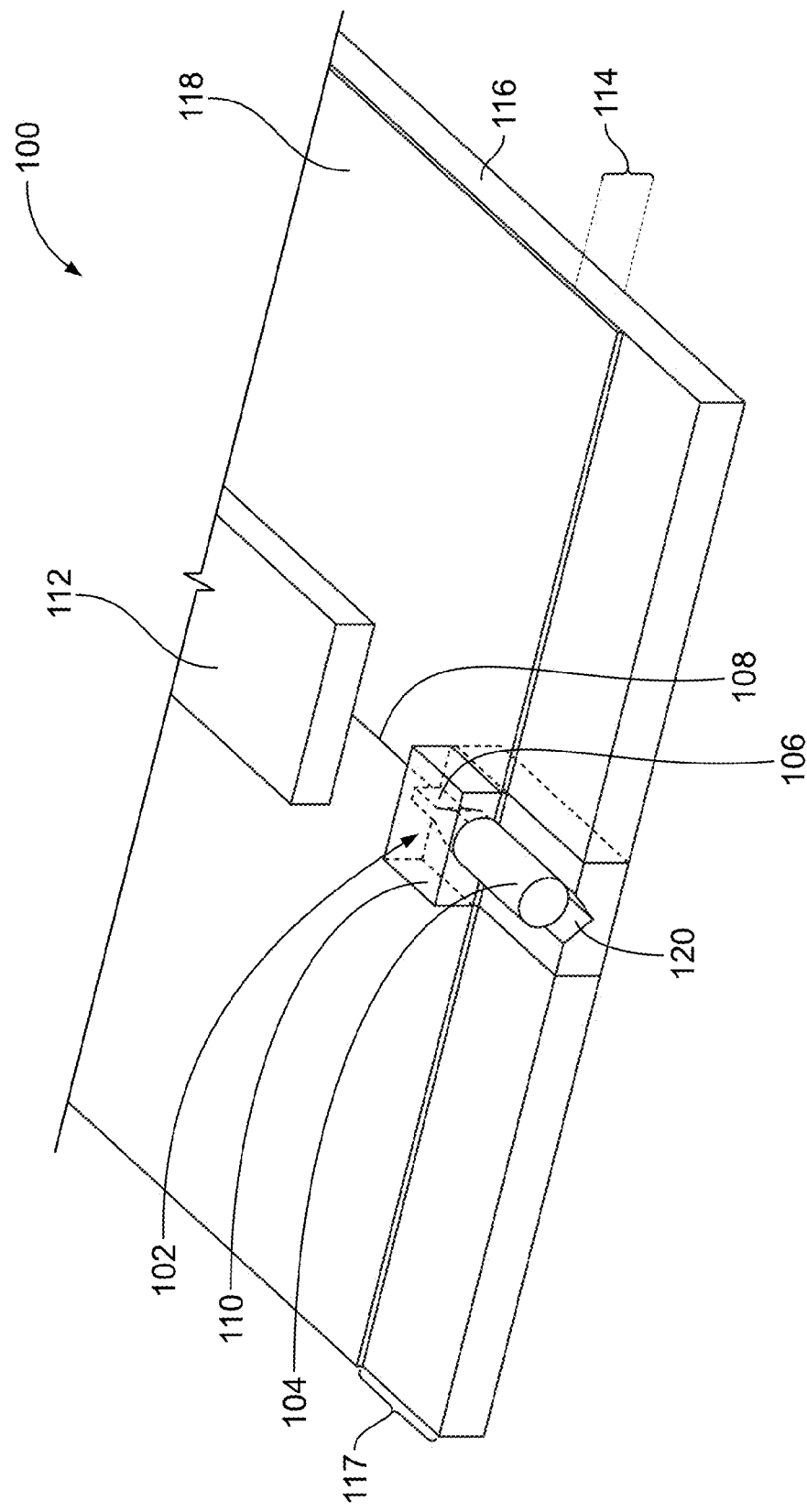
FIG. 1 is a schematic illustration of an optical device including a mode size converter (MSC) formed in accordance with an embodiment.

FIG. 1 is a schematic illustration of a portion of an optical device 100 that includes a mode size converter (MSC) 102 formed in accordance with an embodiment. The MSC 102 may also be referred to as a spot size converter (SSC) and is configured to reduce (or expand) a modal profile of propagating light. The modal profile may also be referred to as a mode field profile. In FIG. 1, the optical device 100 includes only one MSC 102, but may include multiple MSCs 102 in other embodiments. The optical device 100 is configured to receive light (or light signals), process or modulate the light in a designated manner, and then emit the processed or modulated light. In other embodiments, the optical device 100 only receives and processes the light. For example, the optical device 100 may include an optical-to-electrical signal converter. In other embodiments, the optical device 100 only processes and emits light through the MSC 102. For example, the optical device 100 may include an electrical-to-optical signal converter. In an alternative embodiment, the optical device 100 receives and emits the light without processing the light signals. The light may be in the form of, for example, optical data signals. In an exemplary embodiment, the optical device 100 is a photonic integrated circuit (PIC) that is used for communicating and/or processing the optical signals. However, it should be understood that the optical device 100 may be used in other applications. For example, the optical device 100 may be a sensor having a sample that modulates the light signals and/or emits light signals based on properties of the sample. The optical device 100 may also be incorporated into a larger system or device.

In some embodiments, the optical device 100 is an integrated device that includes a silicon photonics chip. At least a portion of the optical device 100 may be fabricated with processes that are used to manufacture semiconductors. For example, the optical device 100 may be manufactured using processes that produce complementary metal-oxide-semiconductor (CMOS) devices and/or silicon-on-insulator (SOI) devices. More specifically, the optical device 100 may be manufactured by growing, depositing, etching, lithographically processing, or otherwise modifying a plurality of a stacked substrate layers. In particular embodiments, the entire optical device 100 is manufactured using CMOS or SOI processes.

The optical device 100 and/or the MSC 102 includes a plurality of substrate layers that are stacked over each other. By way of example, the substrate layers may include one or more layers of silicon oxide, one or more layers of silicon nitride, one or more layers of silicon, one or more buried oxide layers, one or more polymer layers, and/or one or more silicon oxynitride (SiON) layers. The various layers may have refractive indices for directing the light as set forth herein.

The optical device 100 is configured to optically couple to an optical element 104. In the illustrated embodiment, the optical element 104 is an optical fiber (e.g., single-mode fiber (SMF)). The optical mode within the optical fiber may have, for example, a diameter between about 9.2 micrometers and about 10.4 micrometers. In other embodiments, however, the optical element 104 may be another type of optical element that is capable of transmitting light. For example, the optical element 104 may be a planar waveguide, a light source, or a light detector. In some embodiments, the optical device 100 may operate bi-directionally such that light may be provided from the optical element 104 to the MSC 102 or, alternatively, provided from the MSC 102 to the optical element 104. Accordingly, although the following description may use directional terms when describing the propagation of light, it is understood that, in some embodiments, the light may propagate in the opposite direction. In a similar manner, although terms such as "over," "overlay," or "elevation" may be used herein, it should be understood that the optical device 100 may have any orientation with respect to gravity.

The MSC 102 may include an overlay waveguide 106 and a signal waveguide 108 that is at least partially buried within or under the overlay waveguide 106. The signal waveguide 108 may be referred to as a nanowire waveguide in some embodiments. The MSC 102 may also include a cladding layer or body 110 that is located over the overlay waveguide 106. The overlay waveguide 106 may be at least partially embedded or buried within the cladding layer 110. The MSC 102 is configured to receive light from the optical element 104 and reduce a modal profile of the incoming light to a modal profile that is sufficient for propagating through the signal waveguide 108. Alternatively, the MSC 102 may be configured to expand a modal profile of outgoing light and provide the outgoing light to the optical element 104.

The signal waveguide 108 is communicatively coupled to an optical circuit 112. The optical circuit 112 is illustrated generically as a block in FIG. 1, as it should be understood that a variety of optical circuits may be used. The optical circuit 112 may be configured to process the light (or light signals) propagating through the optical device 100 in a predetermined manner. Non-limiting examples of applications for the optical device 100 or the optical circuit 112 include optical switches, couplers, routers, splitters, modulators, amplifiers, multiplexers/demultiplexers, wavelength converters, optical-to-electrical, and electrical-to-optical signal converters. In other embodiments, the optical circuit 112 may be part of a sensor that is configured to detect one or more properties of an environment or of a sample.

In the illustrated embodiment, the optical device 100 also includes a device substrate 114 having first and second substrate layers 116, 118. The signal waveguide 108, the overlay waveguide 106, and the cladding layer 110 are stacked onto the device substrate 114. As shown, the MSC 102 is an in-plane coupling structure that is configured to receive light propagating in a direction that is parallel to a plane of the device substrate 114. In an exemplary embodiment, the first and second substrate layers 116, 118 are shaped to engage the optical element 104. For example, the first substrate layer 116 forms a mounting extension 117 that extends beyond the second substrate layer 118. The mounting extension 117 includes a groove 120 that is sized and shaped relative to the optical element 104. For example, the size and shape of the groove 120 may be configured to align the optical element 104 (e.g., optical fiber) with respect to the MSC 102 so that the light propagating through the optical element 104 may be efficiently received by the optical device 100.

Figure 2A:
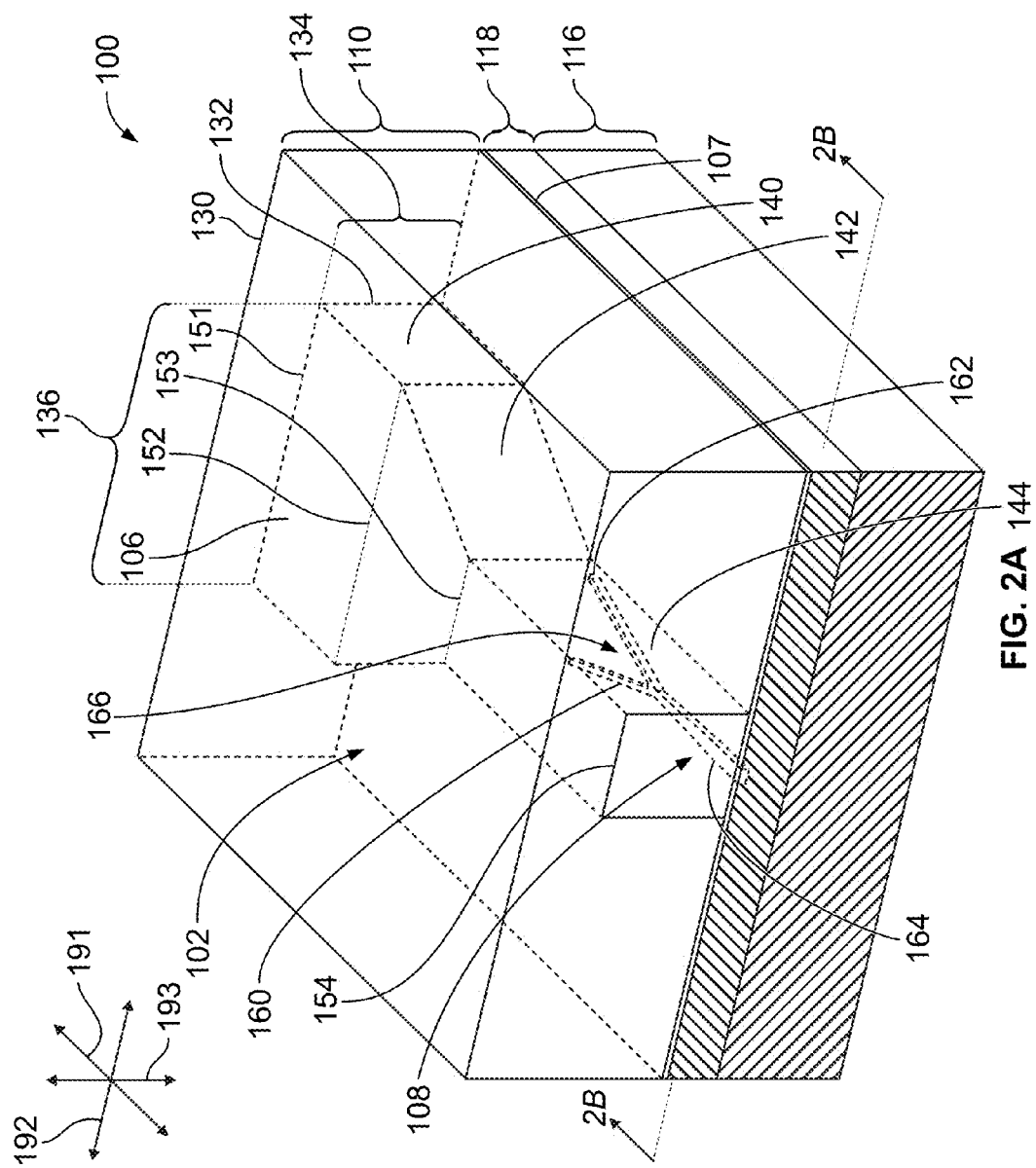
FIG. 2A is an enlarged view of the optical device showing the MSC in greater detail.
Figure 2B:
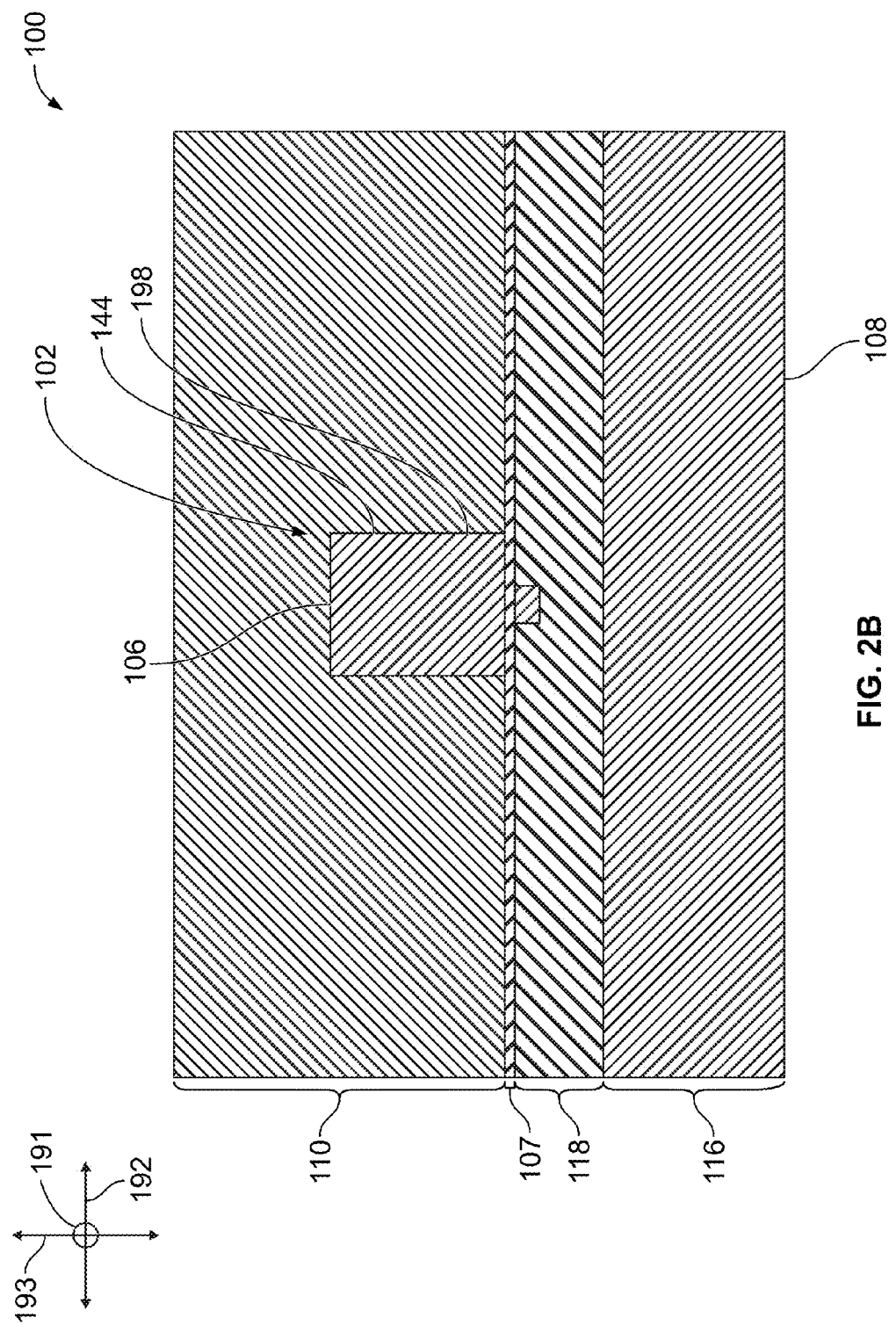
FIG. 2B is a cross-section of the optical device taken along the line 2B-2B in FIG. 2A.

FIG. 2A is an enlarged view of a portion of the optical device 100 including the MSC 102, and FIG. 2B is a cross-section of the optical device 100 taken along the line 2B-2B in FIG. 2A. The cladding layer 110 includes an input end or face 130 (FIG. 2A), and the overlay waveguide 106 includes an input end or face 132 (FIG. 2A). The input ends 130, 132 may be planar or flat. At least one of the input ends 130, 132 is exposed to an exterior of the optical device 100 and may receive light from the optical element 104 (FIG. 1). For example, the optical element 104 may be positioned such that the optical element 104 abuts or is positioned immediately adjacent to the input end 130 and/or the input end 132. In an exemplary embodiment, the mounting extension 117 (FIG. 1) of the first substrate layer 116 extends beyond the input ends 130, 132. The light propagates through the input end 132 of the overlay waveguide 106.

As described above, the optical device 100 and the MSC 102 may be formed from a plurality of substrate layers. The substrate layers may have different refractive indices. Each of the substrate layers may constitute a single layer or include a plurality of sub-layers. For example, the cladding layer 110 may include multiple cladding sub-layers. In one or more embodiments, the cladding layer 110 may be comprised of a polymer or silicon oxynitride (SiON) having a refractive index of, for example, about 1.50. The overlay waveguide 106 may be comprised of a polymer or SiON and have a refractive index of, for example, about 1.50 to about 1.60. Optionally, a protective layer 107 may extend between the overlay waveguide 106 and the signal waveguide 108. The protective layer 107 may comprise, for example, silicon nitride and may have a refractive index of, for example, about 2.00. The signal waveguide 108 may be comprised of silicon and have a refractive index of, for example, about 3.50. The second substrate layer 118 maybe comprised of silicon oxide and have a refractive index of, for example, about 1.45. The first substrate layer 116 may be comprised of silicon and have a refractive index of, for example, about 3.50.

With respect to FIG. 2A, the overlay waveguide 106 is configured to receive the light and allow the light to propagate toward the signal waveguide 108. Optionally, the overlay waveguide 106 may include one or more portions with different cross-sectional areas. As shown, the optical device 100 is oriented with respect to mutually perpendicular axes 191-193, including a longitudinal axis 191, a lateral axis 192, and an elevation axis 193. The overlay waveguide 106 has a height 134 that is measured along the elevation axis 193 and a width 136 that is measured along the lateral axis 192. Light from the optical element 104 is configured to propagate through the input ends 132 along a light-propagating axis 198 (shown in FIG. 2B and FIG. 3) that is parallel to the longitudinal axis 191. In some embodiments, the light-propagating axis 198 extends through a geometric center of the overlay waveguide 106 such that the light-propagating axis 198 is above the signal waveguide 108.

In some embodiments, the cross-sectional area of the overlay waveguide 106 may change in size in order to convert the modal profile of the propagating light. For example, the cross-sectional area of the overlay waveguide 106 may decrease as the light propagates there through to reduce or decrease the modal profile of the light. In particular embodiments, the width 136 changes along different sections of the overlay waveguide 106. As shown in FIG. 2A, the overlay waveguide 106 has an input profile 151, a first cross-section 152, a second cross-section 153, and an output profile 154, which may also be referred to as a third cross-section. In the illustrated embodiment, the height 134 is uniform from the input profile 151 to the output profile 154 (or third cross-section). The output profile 154 may or may not represent an end of the overlay waveguide 106. More specifically, the overlay waveguide 106 may continue beyond what is shown in FIG. 2A with the signal waveguide 108.

The input profile 151, the first and second cross-sections 152, 153, and the output profile 154 show the overlay waveguide 106 as including three different sections or portions. More specifically, the overlay waveguide 106 may include a receiving section 140 that extends between the input profile 151 and the first cross-section 152, a taper section 142 that extends between the first and second cross-sections 152, 153, and a channel section 144 that extends between the second cross-section 153 and the output profile 154. FIG. 2B is a cross-section of the channel section 144. Each of the first and second cross-sections 152, 153 may be referred to as a boundary between the adjacent sections. For example, the second cross-section 153 may be referred to as the boundary 153 between the taper section 142 and the channel section 144. In an exemplary embodiment, the light-propagating axis 198 extends generally through a geometric center of the receiving section 140. The light-propagating axis 198 may also extend generally through geometric centers of the taper section 142 and the channel section 144.

Each of the receiving section 140, the taper section 142, and the channel section 144 have different cross-sectional areas taken transverse to the light-propagating axis 198. The cross-sectional area of the receiving section 140 is uniform from the input profile 151 to the first cross-section 152. The cross-sectional area of the taper section 142, however, reduces or tapers as the taper section 142 extends from the first cross-section 152 to the second cross-section 153. In particular, the width 136 of the overlay waveguide 106 reduces from the first cross-section 152 to the second cross-section 153. The rate of reduction may be configured to reduce the modal profile by a designated amount. In other embodiments, the height 134 may reduce (e.g., through different sized stacked layers) along the taper section 142. The cross-sectional area of the channel section 144 is uniform from the second cross-section 153 to the output profile 154. In other embodiments, the channel section 144 may also taper.

As shown in FIGS. 2A and 2B, the signal waveguide 108 is embedded or buried within the second substrate layer 118. In other embodiments, however, the signal waveguide 108 may be positioned above the second substrate layer 118. As an example, the signal waveguide 108 may be positioned above the second substrate layer 118 and embedded within a protective layer and/or the overlay waveguide 106. In the illustrated embodiment, however, the protective layer 107 extends between the overlay waveguide 106 and the signal waveguide 108. The signal waveguide 108 has a refractive index that is greater than the refractive index of the second substrate layer 118 and the refractive index of the protective layer 107. For example, as described above, the second substrate layer 118 may have a refractive index of about 1.45, the protective layer may have a refractive index of about 2.00, and the signal waveguide 108 may have a second refractive index of about 3.50. As shown in FIG. 2A, the signal waveguide 108 includes first and second arm segments 160, 162 and a stem segment 164. The stem segment 164 may be a portion of the signal waveguide 108 that is configured to satisfy a propagating mode of the light. The first and second arm segments 160, 162 and the stem segment 164 may form a Y-junction 166.

As described herein, the first and second arm segments 160, 162 of the signal waveguide 108 are configured to reduce a modal profile of the light propagating from the input end 132 of the overlay waveguide 106 toward the stem segment 164. In some embodiments, the signal waveguide 108 is located within the taper section 142 and the channel section 144, but not within the receiving section 140. In other embodiments, the signal waveguide 108 is located only within the channel section 144. In alternative embodiments, the signal waveguide 108 may be located within the receiving section 140, the taper section 142, and the channel section 144. In some embodiments, the first and second arm segments 160, 162 are configured relative to the shapes of the different sections of the overlay waveguide 106 to convert the modal profile of the light in an efficient manner.

Figure 3:
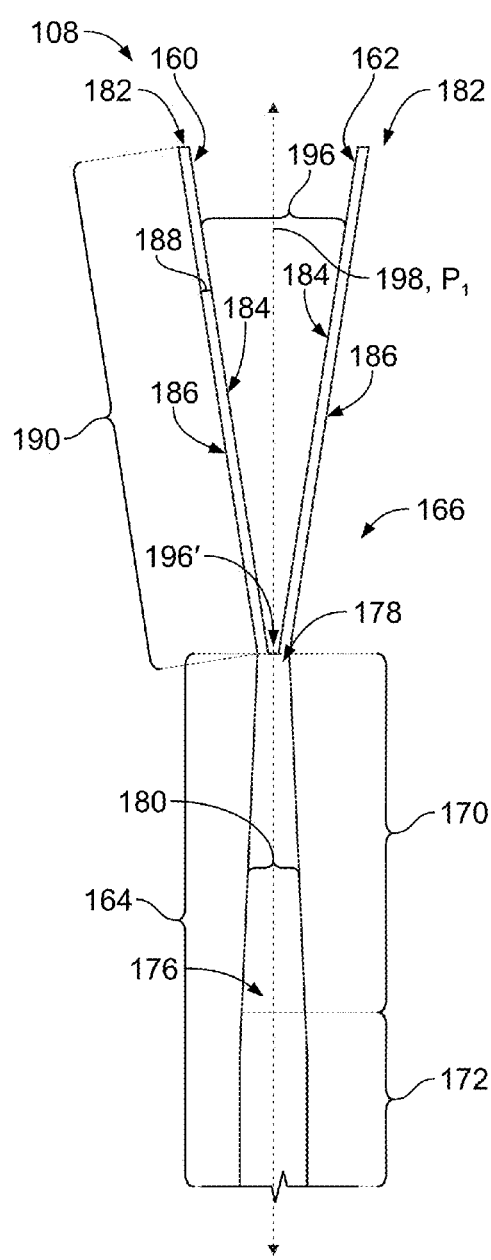
FIG. 3 is a plan view of a signal waveguide of the MSC formed in accordance with an embodiment.

FIG. 3 is a plan view of the signal waveguide 108 of the MSC 102 (FIG. 1). The stem segment 164 includes an intermediate portion 170 and a guide portion 172. In the illustrated embodiment, the intermediate portion 170 and the guide portion 172 do not have a common or uniform cross-sectional shape. For example, the intermediate portion 170 may have an inverted taper geometry. More specifically, the intermediate portion 170 includes a base 176 and a coupling end 178. The signal waveguide 108 has a waveguide width 180. As the signal waveguide 108 extends from the base 176 to the coupling end 178, the waveguide width 180 may reduce or decrease in size. Alternatively, the waveguide width 180 increases in size as the signal waveguide 108 extends from the coupling end 178 to the base 176.

In such embodiments, the waveguide width 180 may change at a tapering rate. The tapering rate may be configured to efficiently couple the light into the stem segment 164. The tapering rate may be based on one or more factors or parameters, such as the modal profile of the incoming light, a cross-sectional area of the overlay waveguide 106 along the stem segment 164, dimensions of the first and second arm segments 160, 162, and/or positions of the first and second arm segments 160, 162 relative to each other. The waveguide width 180 may be uniform or constant along the guide portion 172. The waveguide width 180 along the guide portion 172 is configured to satisfy a propagating mode of the light.

In an exemplary embodiment, a height of the signal waveguide 108 is uniform throughout the stem segment 164 and the first and second arm segments 160, 162. Each of the first and second arm segments 160, 162 has a distal end or tip 182 and a pair of opposite side edges 184, 186. Each of the first and second arm segments 160, 162 has a length 190 that is measured from the distal end 182 to the coupling end 178 of the stem segment 164. As shown, the first and second arm segments 160, 162 form a V-shaped structure that couples to the stem segment 164 to form the Y-junction 166. More specifically, the side edges 184 of the first and second arm segments 160, 162 substantially face each other and are separated by an operable gap 196. The operable gap 196 decreases in size as the first and second arm segments 160, 162 extend from the respective distal ends 182 to the coupling end 178 of the stem segment 164. In the illustrated embodiment, the first and second arm segments 160, 162 are separated from each other when the first and second arm segments 160, 162 join the coupling end 178. As such, the operable gap 196 exists along or at the coupling end 178 (indicated as 196'). In alternative embodiments, however, the first and second arm segments 160, 162 may join each other such that the side edges 184 form a V-shaped joint.

The operable gap 196 may decrease in size at a gap-reducing rate. The gap-reducing rate may be configured to efficiently couple the light into the stem segment 164. The gap-reducing rate may be based on one or more factors or parameters, such as the modal profile of the incoming light, a cross-sectional area of the overlay waveguide 106 along the first and second arm segments 160, 162, and/or dimensions of the first and second arm segments 160, 162.

In an exemplary embodiment, the lengths 190 of the first and second arm segments 160, 162 are identical. In an exemplary embodiment, the Y-junction 166 is symmetrical with respect to a plane $P_1$ that includes the light-propagating axis 198 with the plane $P_1$ extending through a center of the stem segment 164. Both the plane $P_1$ and the light-propagating axis 198 are represented by a dashed line in FIG. 3. The plane $P_1$ may extend parallel to a plane formed by the elevation axis 192 (FIGS. 2A&2B) and the longitudinal axis 191 (FIGS. 2A&2B). In other embodiments, however, the Y-junction 166 may not be symmetrical with respect to the plane $P_1$.

As set forth herein, the first and second arm segments 160, 162 are configured to reduce a modal profile of the light propagating from the input end 132 (FIG. 2) of the overlay waveguide 106 (FIG. 1) toward the stem segment 164. For instance, each of the first and second arm segments 160, 162 is configured to progressively receive more light energy as the light propagates toward the stem segment 164. The light energy within each of the first and second arm segments may then join within the stem segment 164 proximate to the coupling end 178.

In the illustrated embodiment, each of the pair of side edges 184, 186 extends parallel to each other between the corresponding distal end 182 and the stem segment 164. For example, the side edges 184, 186 may define an arm width 188 therebetween. The arm width 188 may be uniform between the corresponding distal end 182 and the stem segment 164. As used herein, the pair of side edges may extend "parallel to each other between the corresponding distal end and the stem segment" if the side edges extend parallel to each other for at least 50% of the length 190. In the illustrated embodiment, the side edges 184, 186 extend parallel to each other from the corresponding distal end 182 to the stem segment 164 for the entire length 190 of the corresponding arm segment. In other embodiments, however, the side edges 184, 186 are not parallel for the entire length. For example, in some embodiments, the side edges 184, 186 may extend parallel to each other for at least 60% of the length 190 or at least 70% of the length 190. Yet in more particular embodiments, the side edges 184, 186 may extend parallel to each other for at least 80% of the length 190, at least 90% of the length 190, or at least 95% of the length 190. Likewise, the arm width 188 may be uniform for at least 50%, 60%, 70%, 80%, 85%, 90%, or 95% of the length 190. In the illustrated embodiment, the first and second arm segments 160, 162 are linear from the stem segment 164 to the distal end 182. In other embodiments, however, the first and second arm segments 160, 162 are not linear from the stem segment 164 to the distal end 182. For example, the first and second arm segments 160, 162 may include sub-segments that have different angles with respect to the plane $P_1$, such as the sub-segments shown in FIG. 9.

In some embodiments, the distal ends 182 of the first and second arm segments 160, 162 are positioned within the taper section 142 (FIG. 2) or the channel section 144 (FIG. 2) of the overlay waveguide 106 (FIG. 1). In some embodiments, the distal ends 182 are positioned at or immediately near the boundary 153 (FIG. 2) between the taper section 142 and the channel section 144. The distal ends 182 may be immediately near the boundary 153 if, for example, the distal ends are within about 20 micrometers of the boundary 153 measured along the light-propagating axis 198. In some embodiments, the distal ends 182 are positioned within the taper section 142 and the first and second arm segments 160, 162 extend from the taper section 142 into the channel section 144. The distal ends 182 may also be positioned within the channel section 144 after the second cross-section 153. In other embodiments, however, the distal ends 182 of the first and second arm segments 160, 162 may be positioned within the receiving section 140 (FIG. 2) and the first and second arm segments 160, 162 may extend through the taper section 142 toward the channel section 144.

Figure 4:
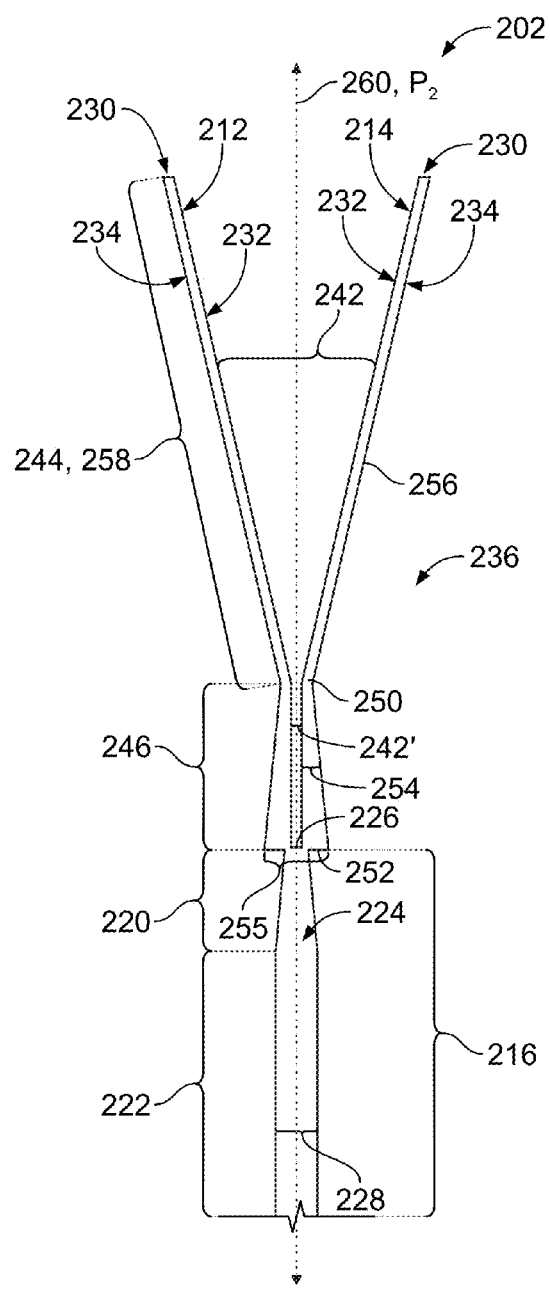
FIG. 4 is a plan view of a signal waveguide formed in accordance with an embodiment.

FIG. 4 is a plan view of a signal waveguide 202 of a MSC 204 (shown in FIG. 5) formed in accordance with an embodiment. The signal waveguide 202 may include similar elements as the signal waveguide 108 (FIG. 2). In some embodiments, the signal waveguide 202 may replace the signal waveguide 108 within the MSC 102 (FIG. 1). The signal waveguide 202 includes first and second arm segments 212, 214 and a stem segment 216. With respect to the stem segment 216, the stem segment 216 includes an intermediate portion 220 and a guide portion 222. Similar to the stem segment 164 (FIG. 2), the intermediate portion 220 and the guide portion 222 do not have the same cross-sectional shape. The intermediate portion 220 has an inverted taper geometry. More specifically, the intermediate portion 220 has a base 224 and a coupling end 226. The stem segment 216 has a waveguide width 228. As the signal waveguide 202 extends from the base 224 to the coupling end 226, the waveguide width 228 may reduce in size. Alternatively, the waveguide width 228 increases in size as the signal waveguide 202 extends from the coupling end 226 to the base 224.

In such embodiments, the waveguide width 228 along the intermediate portion 220 may change at a tapering rate. The tapering rate may be configured to efficiently couple the light into the stem segment 216. The tapering rate may be based on one or more factors or parameters, such as the modal profile of the incoming light, a cross-sectional area of an overlay waveguide 262 (shown in FIG. 5) at the stem segment 216, dimensions of the first and second arm segments 212, 214, and/or positions of the first and second arm segments 212, 214 relative to each other. The waveguide width 228 may be uniform along the guide portion 222. The waveguide width 228 along the guide portion 222 is configured to satisfy a propagating mode of the light.

Each of the first and second arm segments 212, 214 has a distal end or tip 230 and a pair of opposite side edges 232, 234. As shown, the first and second arm segments 212, 214 form a V-shaped structure that couples to the stem segment 216 to form a Y-junction 236. More specifically, the side edges 232 of the first and second arm segments 212, 214 substantially face each other and are separated by an operable gap 242. The operable gap 242 decreases in size as the first and second arm segments 212, 214 extend from the respective distal ends 230 to the coupling end 226 of the stem segment 216. In the illustrated embodiment, the first and second arm segments 212, 214 are separated from each other by the operable gap 242 when the first and second arm segments 212, 214 join the coupling end 226. As such, the operable gap 242 exists along or at the coupling end 226 (indicated as 242'). In alternative embodiments, however, the first and second arm segments 212, 214 may join each other such that the side edges 232 form a V-shaped joint.

In an exemplary embodiment, each of the first and second arm segments 212, 214 includes an angled extension 244 and a base portion 246 coupled to the corresponding angled extension 244. As shown, the angled extensions 244 of the first and second arm segments 212, 214 form a V-shaped pattern with the operable gap 242 changing in size therebetween. The base portions 246 of the first and second segments 212, 214 extend substantially parallel to each other with the operable gap 242 there between. More specifically, the side edges 232 along the base portions 246 of the first and second arm segments 212, 214 extend parallel to each other such that the operable gap 242' does not change in size between the base portions 246.

Like the operable gap 196 (FIG. 3), the operable gap 242 may decrease in size at a gap-reducing rate. The gap-reducing rate may be configured to efficiently couple the light into the stem segment 216. The gap-reducing rate may be based on one or more factors or parameters, such as the modal profile of the incoming light, a cross-sectional area of the overlay waveguide 262 along the first and second arm segments 212, 214, and/or dimensions of the first and second arm segments 214, 214.

In the illustrated embodiment, the base portions 246 have an inverted tap geometry. For example, the base portions 246 include a joint end 250 and a base end 252 and have a waveguide width 254. As the base portions 246 extend from the corresponding joint end 250 to the corresponding base end 252, the waveguide width 254 increases in size. More specifically, although the side edges 232 along the base portions 246 extend parallel to each other, the side edges 234 along the base portions 246 do not extend parallel to each other. Instead, the side edges 234 are angled away from each other as the base portions 246 extend from the corresponding joint end 250 to the corresponding base end 252 thereby increasing the waveguide width 254. As such, the base portions 246 may have a trapezoid-like shape. The waveguide widths 254 may increase at a rate that is configured to facilitate coupling the light energy into the base portion 246 and into the stem segment 216.

As shown in FIG. 4, the side edges 234 along the base portions 246 may form a combined width 255. The combined width 255 adjacent to the coupling end 226 of the stem segment 216 is greater than the waveguide width 228 at the coupling end 226. For example, the combined width 255 may be more than two times (2X) the waveguide width 228 at the coupling end 226. Also shown, portions of the base ends 252 do not engage the coupling segment 226 such that the base portions 246 only partially overlap with the coupling end 226. For example, at most 30% of the cross-sectional area that is adjacent to the coupling end 226 may overlap with the coupling end 226 for each of the base portions 246.

Each of the pair of side edges 232, 234 may extend parallel to each other between the corresponding distal end 230 and the corresponding joint end 250. For example, the side edges 232, 234 may define an arm width 256 there between. The arm width 256 may be uniform between the corresponding distal end 230 and the corresponding joint end 250. The angled extensions 244 have respective lengths 258. In the illustrated embodiment, the side edges 232, 234 extend parallel to each other for the entire length 258 of the corresponding angled extension 244. In other embodiments, the side edges 232, 234 are not parallel for the entire length 258. For example, the side edges 232, 234 may extend parallel to each other for at least 50%, 60%, 70%, 80%, 85%, 90%, or 95% of the length 258.

In an exemplary embodiment, the lengths 258 of the angled extensions 244 of the first and second arm segments 212, 214 are identical. In other embodiments, however, the lengths 258 of the angled extensions 244 may be different. In an exemplary embodiment, the Y-junction 236 is symmetrical with respect to a plane $P_2$ that includes a light-propagating axis 260 with the plane $P_2$ extending through a center of the stem segment 216. Both the plane $P_2$ and the light-propagating axis 260 are represented by a dashed line in FIG. 4. In other embodiments, however, the Y-junction 236 may not be symmetrical with respect to the plane $P_2$.

In some embodiments, the different portions of the signal waveguide 202 may be fabricated using at least one of a silicon-on-insulator (SOI) process or a complementary metal-oxide-semiconductor (CMOS) process. In particular, the dimensions of the stem segment 216, the base portions 246, and the angled extensions 244 may render the signal waveguide 202 less challenging to manufacture than other proposed mode converting structures.

Figure 5:
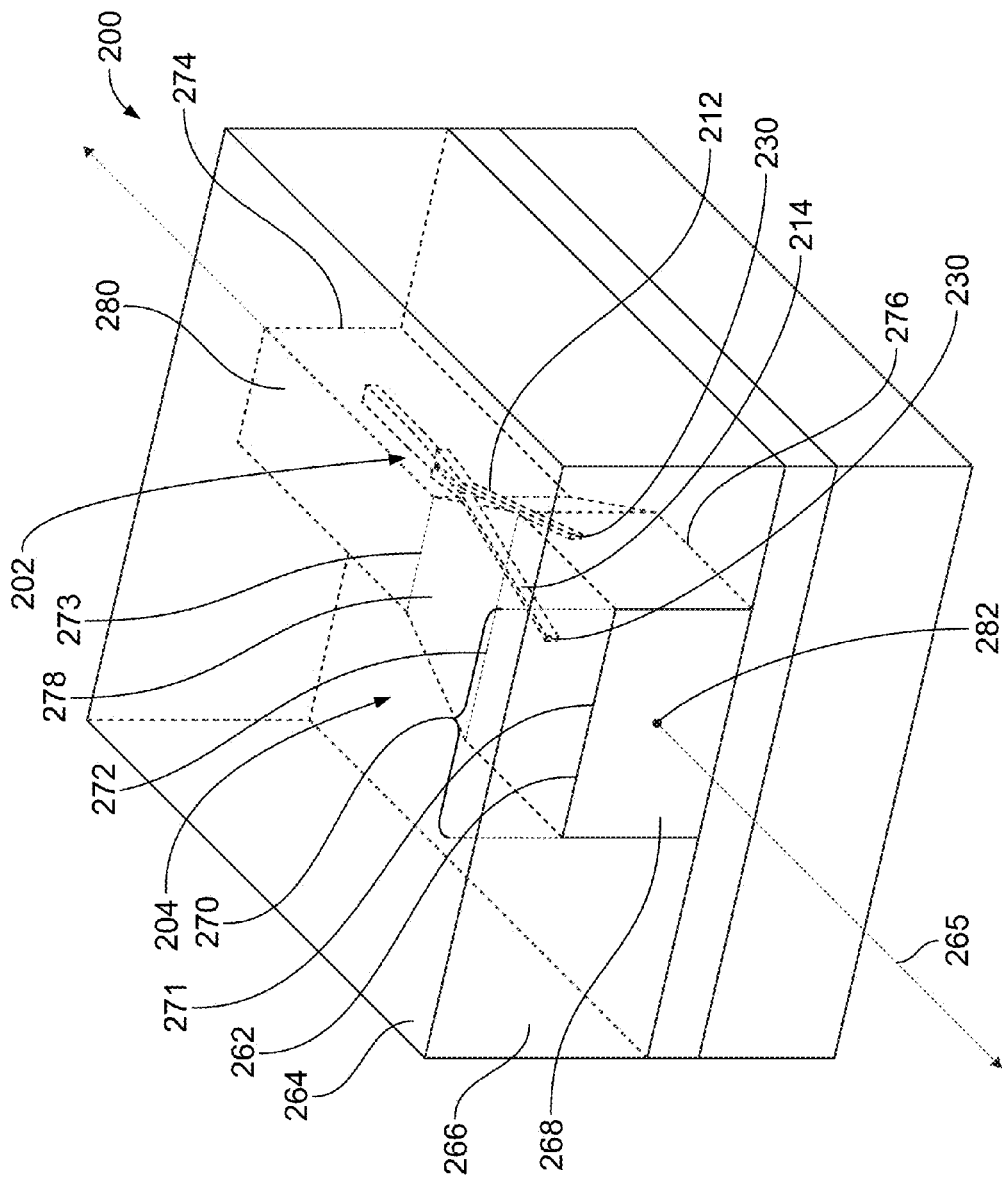
FIG. 5 is an enlarged view of an optical device having an MSC that includes the signal waveguide of FIG. 4.

FIG. 5 is an enlarged view of an optical device 200 having the MSC 204 that includes the signal waveguide 202. The optical device 200 may have similar elements as the optical device 100 (FIG. 1) and may be formed from a plurality of substrate layers. For example, the optical device 200 includes an overlay waveguide 262 having the signal waveguide 202 embedded therein. The MSC 204 may also include a cladding layer or body 264 that is located over the overlay waveguide 262. The overlay waveguide 262 may be embedded or buried within the cladding layer 264. The MSC 204 is configured to receive light from an optical element (not shown), such as an optical fiber, along a light-propagating axis 265 and convert a modal profile of the incoming light to a modal profile that is sufficient for propagating through the signal waveguide 202. Alternatively, the MSC 204 may be configured to convert a modal profile of outgoing light to a modal profile that is sufficient for propagating through the optical element. Although not shown, the signal waveguide 202 may be communicatively coupled to an optical circuit, such as the optical circuit 112 (FIG. 1).

The cladding layer 264 includes an input end or face 266, and the overlay waveguide 262 includes an input end or face 268. The input ends 266, 268 may be planar surfaces. At least one of the input ends 266, 268 is exposed to an exterior of the optical device 200 and may receive light from the optical element. For example, the optical element may be positioned such that the optical element abuts or is positioned immediately adjacent to the input end 266 and/or the input end 268. The light propagates through the input end 268 of the overlay waveguide 262 and propagates into the signal waveguide 202.

Similar to the overlay waveguide 106 (FIG. 1), the cross-sectional area of the overlay waveguide 262 may change in size in order to convert the modal profile of the light. For instance, the overlay waveguide 262 may have a width 270 that changes along different sections of the overlay waveguide 262. In FIG. 5, the overlay waveguide 262 has an input profile 271, a first cross-section 272, a second cross-section 273, and an output profile 274, which may also be referred to as a third cross-section. The output profile 274 may or may not represent an end of the overlay waveguide 262.

The input profile 271, the first and second cross-sections 272, 273, and the output profile 274 illustrate the overlay waveguide 262 as including three different sections. More specifically, the overlay waveguide 262 may include a receiving section 276 that extends between the input profile 271 and the first cross-section 272, a taper section 278 that extends between the first and second cross-sections 272, 273, and a channel section 280 that extends between the second cross-section 273 and the output profile 274. In an exemplary embodiment, the light-propagating axis 265 extends generally through a geometric center of the receiving section 276. The light-propagating axis 265 may also extend generally through geometric centers of the taper section 278 and the channel section 280.

The receiving section 276, the taper section 278, and the channel section 280 may be similar or identical to the receiving section 140, the taper section 142, and the channel section 144, respectively, shown in and described with respect to FIG. 2. In an exemplary embodiment, the distal ends 230 of the first and second arm segments 212, 214 are positioned within the taper section 278. In other embodiments, the distal ends 230 may be positioned within the receiving section 276, within the channel section 280, or at or immediately near a boundary between adjacent sections. More specifically, the distal ends 230 may be positioned at or immediately near the first cross-sections 272 or the second cross-section 273.

The input profile 271 of the overlay waveguide 262 is sized and shaped relative to the incoming light so that the modal profile of the incoming light may be decreased as described herein. When the MSC 204 and the optical element are operably positioned with respect to each other, the incoming light is received at an entry point 282 along the input profile 271. The entry point 282 may be centered along the light-propagating axis 265. In some embodiments, the MSC 204 may provide greater tolerances for aligning the MSC 204 with respect to the optical element. More specifically, the MSC 204 may allow the incoming light to be angled with respect to the light-propagating axis 265 and/or allow the incoming light to enter the input profile 271 at a location that is offset with respect to the entry point 282. For example, the incoming light may be vertically offset by +/−2.4 micrometers and have only 2 dB loss. The incoming light may be horizontally offset by +/−2.7 micrometers and have only 2 dB loss. The coupling efficiency may be greater than 60% when vertically or horizontally offset by +/−2.5 micrometers. The MSC 204 may operate at TE mode, TM mode, or TE and TM modes with a wideband operation window.

Figure 6:
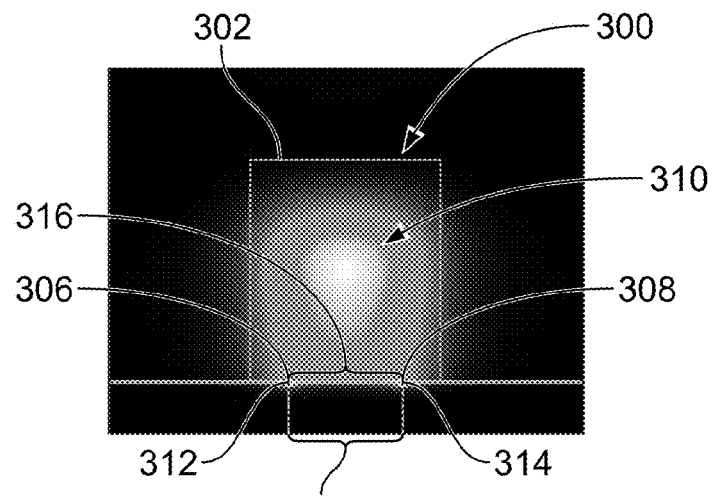
FIG. 6 is a cross-section of an MSC formed in accordance with an embodiment.
Figure 7:
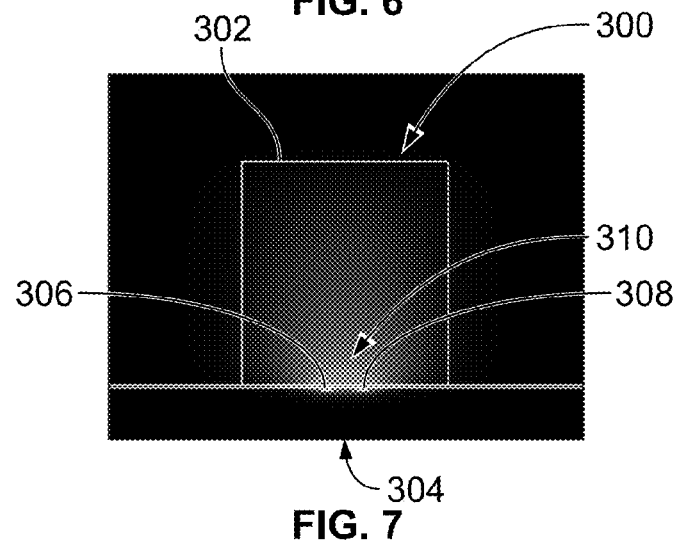
FIG. 7 is another cross-section of the MSC of FIG. 6 illustrating incoming light being progressively confined by a signal waveguide of the MSC.
Figure 8:
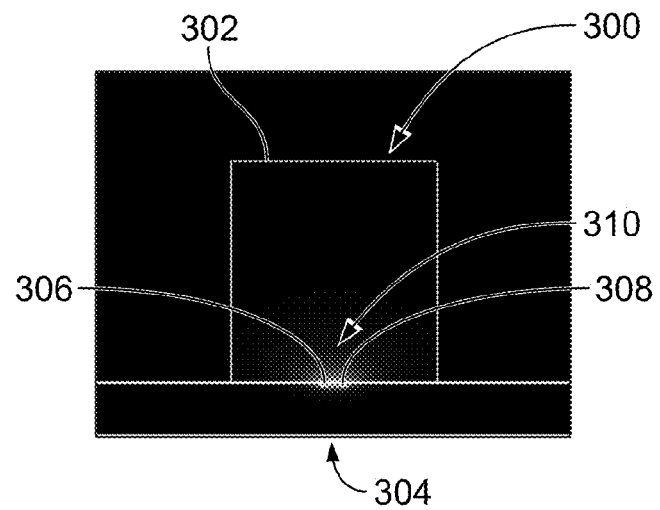
FIG. 8 is another cross-section of the MSC of FIG. 6 illustrating the incoming light being substantially confined within the signal waveguide.

FIGS. 6-8 illustrate different cross-sections of a MSC 300 formed in accordance with an embodiment and demonstrate the conversion of a modal profile of propagating light 310. The MSC 300 may be similar or identical to the MSCs 102 (FIG. 1) and 204 (FIG. 5). For example, the MSC 300 includes an overlay waveguide 302 having a first refractive index and a signal waveguide 304 that is embedded within the overlay waveguide 302 and has a second refractive index. The signal waveguide 304 includes first and second arm segments 306, 308 that join a stem segment (not shown). The first and second arm segments 306, 308 may form a Y-junction, such as the Y-junctions 166 (FIG. 2) and 236 (FIG. 4). In FIGS. 6-8, the overlay waveguide 302 has a common profile such that the overlay waveguide 302 does not change in size. This portion of the overlay waveguide 302 may represent a channel section of the overlay waveguide 302, such as the channel section 144 (FIG. 2) and the channel section 280 (FIG. 5).

FIG. 6 illustrates a cross-section of the MSC 300 proximate to distal ends 312, 314 of the first and second arm segments 306, 308. The distal ends 312, 314 may be positioned at a boundary between the channel section of the overlay waveguide 302 and a taper section (not shown). In such embodiments, the taper section may reduce the modal profile of the incoming light 310 from a modal profile that is determined by the optical element (e.g., optical fiber) to a modal profile that is similar to the modal profile shown in FIG. 6. As shown in FIG. 6, portions of the propagating light 310 have been confined within the first and second arm segments 306, 308. The first and second arm segments 306, 308 are separated by an operable gap 316.

The refractive index and the cross-sectional area of the overlay waveguide 302 and the refractive indices, the cross-sectional areas, and the positions of the first and second arm segments 306, 308 may be configured relative to one another in order to provide an effective refractive index of the MSC 300 that progressively confines the light into the first and second arm segments 306, 308. More specifically, as shown by comparing FIGS. 6-8, the operable gap 316 decreases in size as the first and second arm segments 306, 308 extend toward the stem segment. As the light 310 propagates along the overlay waveguide 302, the effective refractive index of the MSC 300 causes the propagating light 310 to be progressively confined by the first and second arm segments 306, 308. For example, the propagating light 310 is more confined within the first and second arm segments 306, 308 in FIG. 7 than in FIG. 6, and the propagating light 310 is more confined within the first and second arm segments 306, 308 in FIG. 8 than in FIG. 7. In FIG. 8, the portions of the first and second arm segments 306, 308 may represent base portions, such as the base portions 246 (FIG. 4).

Figure 9:
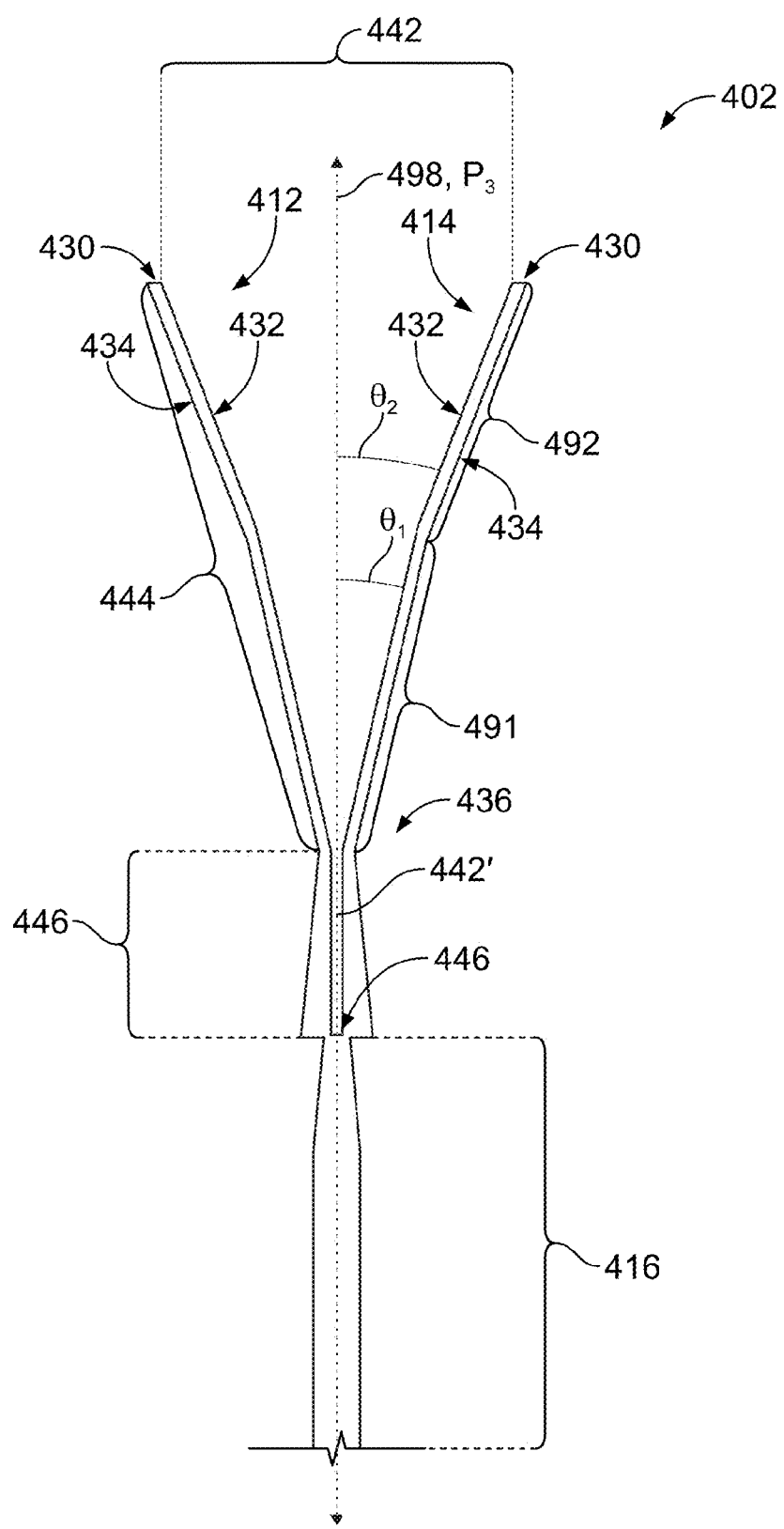
FIG. 9 is a plan view of a signal waveguide formed in accordance with an embodiment.

FIG. 9 is a plan view of a signal waveguide 402 formed in accordance with an embodiment. The signal waveguide 402 may be used with an MSC, such as the MSC 102 (FIG. 1) or the MSC 204 (FIG. 4). The signal waveguide 402 may include similar elements as the signal waveguide 108 (FIG. 2) and/or the signal waveguide 202 (FIG. 4). In some embodiments, the signal waveguide 402 may replace the signal waveguide 108 within the MSC 102 (FIG. 1) or the signal waveguide 202 within the MSC 204 (FIG. 5). The signal waveguide 402 includes first and second arm segments 412, 414 and a stem segment 416. In the illustrated embodiment, the stem segment 416 is identical to the stem segment 216. However, the stem segment 416 may have a different configuration in other embodiments.

Each of the first and second arm segments 412, 414 has a distal end or tip 430 and a pair of opposite side edges 432, 434. As shown, the first and second arm segments 412, 414 form a V-shaped or Y-shaped structure that couples to the stem segment 416 to form a Y-junction 436. As shown, the V-shaped structure of FIG. 9 is different than the V-shaped structure of FIG. 4. The side edges 432 of the first and second arm segments 412, 414 substantially face each other and are separated by an operable gap 442. The operable gap 442 decreases in size as the first and second arm segments 412, 414 extend from the respective distal ends 430 to a coupling end 426 of the stem segment 416. In the illustrated embodiment, the first and second arm segments 412, 414 are separated from each other by the operable gap 442 when the first and second arm segments 412, 414 join the coupling end 426. As such, the operable gap 442 exists along or at the coupling end 426 (indicated as 442'). In alternative embodiments, however, the first and second arm segments 412, 414 may join each other such that the side edges 432 form a V-shaped joint.

In an exemplary embodiment, each of the first and second arm segments 412, 414 includes an angled extension 444 and a base portion 446 coupled to the corresponding angled extension 444. The Y-junction 436 is symmetrical with respect to a plane $P_3$ that includes a light-propagating axis 498 with the plane $P_3$ extending through a center of the stem segment 416. Both the plane $P_3$ and the light-propagating axis 498 are represented by a dashed line in FIG. 9. In some embodiments, the angled extensions are non-linear. For example, each of the angled extensions 444 includes a first sub-segment 491 and a second sub-segment 492. The first sub-segment 491 extends from an end of the corresponding base portion 446 to the second sub-segment 492. The second sub-segment 492 extends from the first sub-segment 491 to the distal end 430. Each of the first and second sub-segments 491, 492 may form a different angle with respect to a plane $P_3$. As shown, the first and second sub-segments 491, 492 form first and second angles $\theta_1$, $\theta_2$, respectively. The first angle $\theta_1$ is less than the second angle $\theta_2$. In alternative embodiments, the first angle $\theta_1$ may be greater than the second angle $\theta_2$. Although FIG. 4 illustrates only two linear sub-segments, it is contemplated that other embodiments may include more than two linear sub-segments. In alternative embodiments, one or more of the sub-segments may not be linear and, instead, may have a curved shaped.

The base portions 446 of the first and second segments 412, 414 extend substantially parallel to each other with the operable gap 442' there between. More specifically, the side edges 432 along the base portions 446 of the first and second arm segments 412, 414 extend parallel to each other such that the operable gap 442' does not change in size between the base portions 446.

The operable gap 442 between the angled extensions 444 may decrease in size at a first gap-reducing rate between the first sub-segments 491 and at a second gap-reducing rate between the second sub-segments 492. The first and second gap-reducing rates and the first and second angles $\theta_1$, $\theta_2$, may be configured to efficiently couple the light into the stem segment 416. The first and second gap-reducing rates and the first and second angles $\theta_1$, $\theta_2$ may be based on one or more factors or parameters, such as the modal profile of the incoming light, a cross-sectional area of the overlay waveguide 462 along the first and second arm segments 412, 414, and/or dimensions of the first and second arm segments 414, 414. In the illustrated embodiment, the base portions 446 have an inverted tap geometry that is identical to the base portions 246.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A mode size converter comprising:
an overlay waveguide having an input end configured to receive light from an optical element, the overlay waveguide having a first refractive index; and
a signal waveguide embedded within the overlay waveguide and having a second refractive index that is greater than the first refractive index, the signal waveguide including first and second arm segments and a stem segment that form a Y-junction, the first and second arm segments configured to reduce a modal profile of the light propagating from the input end of the overlay waveguide toward the stem segment, each of the first and second arm segments having a distal end and a pair of opposite side edges, wherein the pair of side edges extend parallel to each other between the corresponding distal end and the stem segment.

2. The mode size converter of claim 1, wherein each of the first and second arm segments includes an angled extension and a base portion coupled to the angled extension, the angled extensions of the first and second arm segments forming a V-shaped pattern, the base portions of the first and second segments extending substantially parallel to each other with an operable gap there between.

3. The mode size converter of claim 1, wherein the stem segment includes an intermediate portion and a guide portion, the intermediate portion coupling to the first and second arm segments and having an inverted taper geometry that tapers from a base of the intermediate portion to a coupling end of the intermediate portion, the coupling end coupling to the first and second arm segments, the base coupling to the guide portion of the stem segment.

4. The mode size converter of claim 1, wherein the light is configured to propagate along a light-propagating axis from the input end of the overlay waveguide to the stem segment, the Y-junction being symmetrical with respect to a plane that includes the light-propagating axis.

5. The mode size converter of claim 1, wherein the overlay waveguide has a width and includes a taper section, the width of the overlay waveguide reducing along the taper section as the overlay waveguide extends from the input end toward the signal waveguide.

6. The mode size converter of claim 5, wherein the overlay waveguide includes a channel section having at least a portion of the signal waveguide disposed therein, the taper section being located between the input end and the channel section.

7. The mode size converter of claim 6, wherein the distal ends of the first and second arm segments are disposed within the taper section, within the channel section, or at a boundary there between.

8. The mode size converter of claim 6, wherein the distal ends of the first and second arm segments are disposed at or immediately near a boundary between the channel section and the taper section.

9. The mode size converter of claim 1, wherein the mode size converter is formed through at least one of a silicon-on-insulator (SOI) process or a complementary metal-oxide-semiconductor (CMOS) process.

10. A mode size converter comprising:
an overlay waveguide having an input end configured to receive light from an optical element, the overlay waveguide having a first refractive index;
a signal waveguide embedded within the overlay waveguide and having a second refractive index that is greater than the first refractive index, the signal waveguide including first and second arm segments and a stem segment that form a Y-junction, the first and second arm segments configured to reduce a modal profile of the light propagating from the input end of the overlay waveguide toward the stem segment, wherein each of the first and second arm segments includes an angled extension and a base portion coupled to the angled extension, the angled extensions of the first and second arm segments forming a V-shaped pattern, the base portions of the first and second segments extending substantially parallel to each other with an operable gap there between.

11. The mode size converter of claim 10, wherein each of the first and second arm segments has a distal end and a pair of opposite side edges, wherein the pair of side edges extend parallel to each other between the corresponding distal end and the stem segment.

12. The mode size converter of claim 10, wherein the stem segment includes an intermediate portion and a guide portion, the intermediate portion coupling to the first and second arm segments and having an inverted taper geometry that tapers from a base of the intermediate portion to a coupling end of the intermediate portion, the coupling end coupling to the first and second arm segments, the base coupling to the guide portion of the stem segment.

13. The mode size converter of claim 10, wherein the base portions of the first and second segments have inverted taper geometries, each of the base portions extending between a joint end that couples to the corresponding angled extension and a base end that couples to the stem segment.

14. The mode size converter of claim 10, wherein the light is configured to propagate along a light-propagating axis from the input end of the overlay waveguide to the stem segment, the Y-junction being symmetrical with respect to a plane that includes the light-propagating axis.

15. The mode size converter of claim 10, wherein the overlay waveguide has a width and includes a taper section, the width of the overlay waveguide reducing along the taper section as the overlay waveguide extends from the input end toward the signal waveguide.

16. The mode size converter of claim 15, wherein the overlay waveguide includes a channel section having at least a portion of the signal waveguide disposed therein, the taper section being located between the input end and the channel section.

17. The mode size converter of claim 16, wherein the distal ends of the first and second arm segments are disposed within the taper section, within the channel section, or at a boundary there between.

18. The mode size converter of claim 16, wherein the distal ends of the first and second arm segments are disposed at or immediately near a boundary between the channel section and the taper section.

19. The mode size converter of claim 10, further comprising a substrate layer that supports the signal waveguide and the overlay waveguide, the substrate layer having a mounting extension that extends beyond the input end of the overlay waveguide.

20. The mode size converter of claim 10, wherein the mode size converter is formed through at least one of a silicon-on-insulator (SOI) process or a complementary metal-oxide-semiconductor (CMOS) process.

* * * * *